United States Patent [19]

Bandixen

[11] Patent Number: 4,771,876
[45] Date of Patent: Sep. 20, 1988

[54] APPARATUS FOR CHANNELLING ROWS OF ARTICLES INTO SELECTED CONVEYORS

[75] Inventor: Sönke Bandixen, Beringen, Switzerland

[73] Assignee: Sig Schweizerische Industrie-Gesellschaft, Neuhausen am Rheinfall, Switzerland

[21] Appl. No.: 10,790

[22] Filed: Feb. 4, 1987

[30] Foreign Application Priority Data

Feb. 4, 1986 [CH] Switzerland ............................ 433/86

[51] Int. Cl.⁴ ............................................. B65G 37/00
[52] U.S. Cl. .................................... 198/367; 198/442; 193/31 A
[58] Field of Search ............... 198/367, 442, 560, 360, 198/362, 366, 436, 437; 193/31 A, 23

[56] References Cited

U.S. PATENT DOCUMENTS 2,854,126  9/1958  Rosenberger, Jr. ............. 198/367 X
3,193,078  7/1965  Amenta et al. .
4,060,165  11/1977  Bauer .............................. 198/367 X
4,147,248  4/1979  Kurczak et al. ................. 198/442 X
4,723,649  2/1988  Hartness et al. ..................... 198/442

FOREIGN PATENT DOCUMENTS 364454  10/1962  Switzerland .
367751   4/1963  Switzerland .
529006  11/1972  Switzerland .
2131378   6/1984  United Kingdom .

Primary Examiner—Robert J. Spar
Assistant Examiner—Cheryl Gastineau
Attorney, Agent, or Firm—Spencer & Frank

[57] ABSTRACT

A re-routing apparatus for selectively channelling articles conveyed in at least two side-by-side arranged rows to one of a first and a second article advancing mechanism has an inclined chute arranged for simultaneously receiving articles belonging to different rows; a base plate extending from below the chute for receiving the articles sliding off the chute; and a plurality of parallel, generally vertically oriented, mutually spaced separating walls arranged above the base plate and defining therewith a plurality of side-by-side arranged, alternating first and second channels. Each channel has an upstream end corresponding to the receiving end of the base plate and a downstream end corresponding to the discharge end of the base plate. The first and the second channels are arranged to supply articles to the first and the second article advancing mechanism, respectively. A pivot arrangement supports each separating wall at a location remote from the upstream end of the channels for allowing a swinging motion of each separating wall in a plane generally parallel to the base plate and an actuating mechanism connected to each separating wall for moving them in unison into a first position in which articles are received solely by the first channels from the chute and into a second position in which articles are received solely by the second channels from the chute.

3 Claims, 2 Drawing Sheets

APPARATUS FOR CHANNELLING ROWS OF ARTICLES INTO SELECTED CONVEYORS

BACKGROUND OF THE INVENTION

This invention relates to a conveying system, particularly for use in the mass production of confectionery items for advancing the items from a baking oven to a processing machine, such as a packing apparatus.

For packaging confectionery items in mass production, it is conventional to subdivide the stream of articles discharged by the baking oven into a plurality of partial streams, each being advanced to a separate packing machine. Normally, such a packaging line includes a standby packing machine for the event that one of the machines breaks down, at which time the article stream intended for the defective machine is re-routed to the standby apparatus.

Swiss Pat. No. 364,454 discloses an apparatus of the above-outlined type for the selective re-routing of a multi-column stream of items onto one of two conveyor devices. The items are supplied to the apparatus in an edgewise standing orientation to thus form a lying stack. The re-routing is effected by causing guides to pivot in a vertical direction. It is a disadvantage of this arrangement that due to forces derived from inertia and the elasticity of the lying stack the items may be jammed, causing operational disturbances.

Swiss Pat. No. 367,751 discloses a method for re-routing items prior to setting them on edge and forming stacks therefrom. In the normal position of the apparatus the items are caused to vault in a free flight over an opening and are further conveyed on the upper face of a gate to a first conveyor belt. For causing a re-routing, the gate is pivoted into an upper position, whereupon the items are guided along the underside of the gate to a second, lower-lying conveyor belt. It is a disadvantage of this arrangement that the items have to be of significant strength to avoid breakage and it is not feasible to combine the apparatus with an additional cooling track.

U.S. Pat. No. 3,193,078 discloses an apparatus for dividing a single row into parallel channels, wherein the downstream end of an adjustable individual channel with lateral walls may be pivoted by means of a pneumatic cylinder unit into selected positions corresponding to the plurality of individual rows.

British Published Patent Application No. 2,131,378 discloses an apparatus similar to that shown in U.S. Pat. No. 3,193,078, except that the apparatus operates in the reverse order such that the number of article rows is reduced to a smaller number of rows for the downstream conveying apparatus.

Swiss Pat. No. 529,006 shows an apparatus for the uniform distribution of articles, supplied in a plurality of rows, into a greater number of conveying rows. The article rows are admitted by means of a slide onto plates which are oscillated about axes oriented at an inclination to the direction of conveyance and which cause the items to slide alternatingly into adjoining channels. It is a disadvantage of this arrangement that, since the items undergo lateral sliding, their orientation is changed in an undetermined manner. This is particularly a drawback in case the items are provided, for example, with embossed designs which, in the finished package, should have a predetermined orientation.

SUMMARY OF THE INVENTION

It is an object of the invention to provide an improved apparatus of the above-outlined type which is of simple construction, which has a reduced number of movable components, which handles the items in a gentle manner and in which a jamming of the articles cannot occur.

These objects and others to become apparent as the specification progresses, are accomplished by the invention, according to which, briefly stated, the re-routing apparatus for selectively channelling articles conveyed in at least two side-by-side arranged rows to one of a first and a second article advancing mechanism has an inclined chute arranged for simultaneously receiving articles belonging to different rows; a base plate extending from below the chute for receiving the articles sliding off the chute; and a plurality of parallel, generally vertically oriented, mutually spaced separating walls arranged above the base plate and defining therewith a plurality of side-by-side arranged, alternating first and second channels. Each channel has an upstream end corresponding to the receiving end of the base plate and a downstream end corresponding to the discharge end of the base plate. The first and the second channels are arranged to supply articles to the first and the second article advancing mechanism, respectively. A pivot arrangement supports each separating wall at a location remote from teh upstream end of the channels for allowing a swinging motion of each separating wall in a plane generally parallel to the base plate and an actuating mechanism connected to each separating wall for moving them in unison into a first position in which articles are received solely by the first channels from the chute and into a second position in which articles are received solely by the second channels from the chute.

DESCRIPTION OF THE PREFERRED EMBODIMENT

Figure 1:
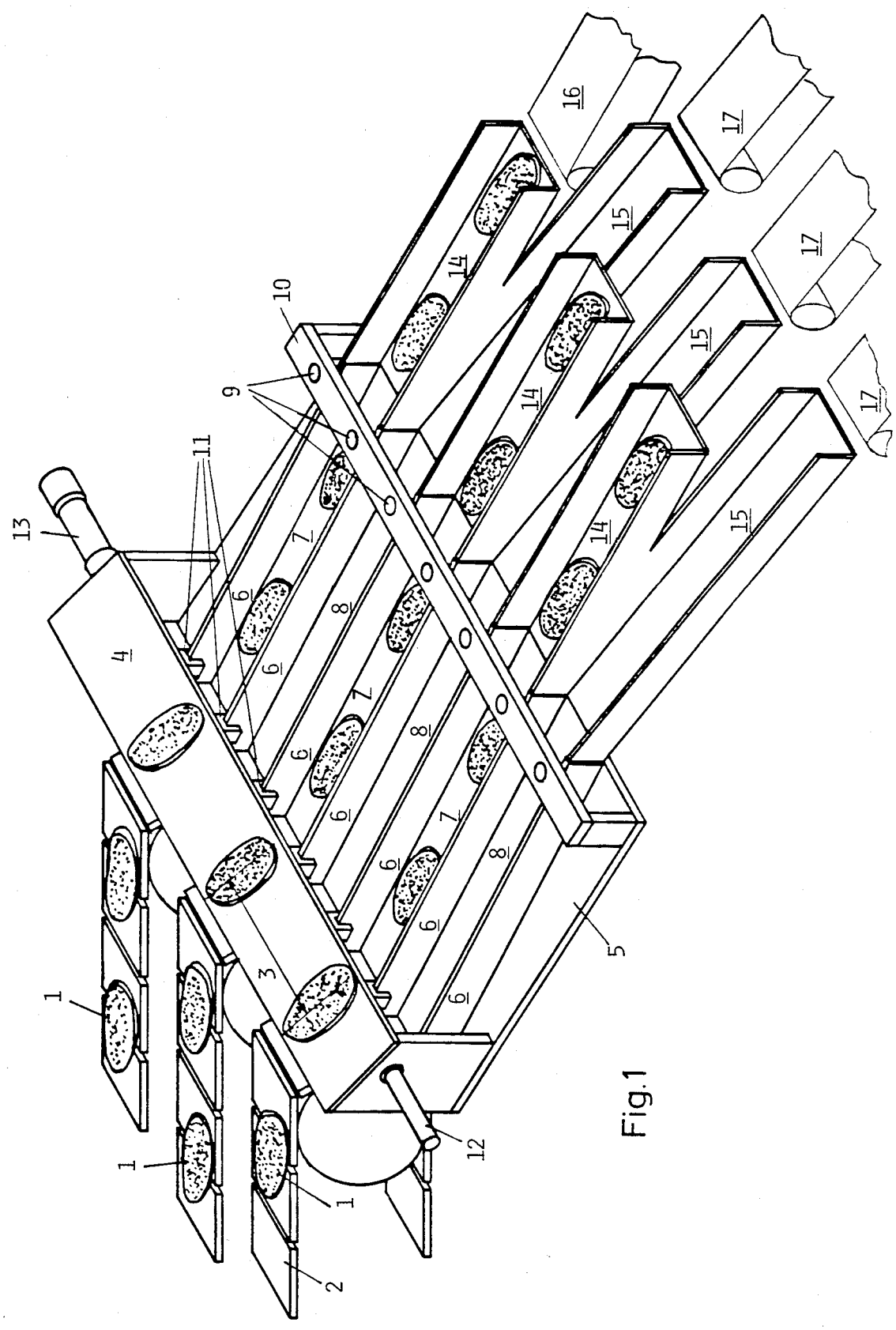
FIGS. 1 and 2 are schematic perspective views of a preferred embodiment of the invention, illustrating two operating positions thereof.

Turning to the FIGS., in the apparatus shown therein, confectionery items such as biscuits 1 are supplied in three rows on plate chains 2 to the re-routing apparatus structured according to the invention. The rows of articles have a lateral distance 3 from one another which is slightly greater than twice the dimension of the items measured in the same (lateral) direction. The items are transferred from the plate chains 2 to a slide or chute 4 which is inclined downwardly in the direction of conveyance at an angle of 15°–45° for causing the items to slide downwardly thereon. The slide 4 is affixed to a base plate 5 which too, is downwardly inclined in the conveying direction at an angle of 15°–45°. On the base plate 5 six channels 7 and 8 are formed by vertically oriented separating walls 6. The separating walls 6 are at the end projecting below the slide 4 not higher than one half the width of the channels 7 and 8. Each separating wall 6 carries a pin 9 which is rotatably held in a transverse carrier bar 10 and which is oriented perpendicularly to the base plate 5. By virtue of this arrangement each separating wall 6 is pivotally supported in the transverse carrier bar 10 for a swinging motion about the respective pin 9 in a plane parallel to the base plate 5. At their upstream end the separating walls 6 are engaged by forked actuators 11 which are secured to a piston rod 12 of a power device, such as a pneumatic cylinder unit 13. The stroke of the cylinder unit 13 corresponds to the width of one channel 7 or 8.

As a continuation of the channels 7 and 8 further channels 14 and 15 are arranged in such a manner that they alternatingly terminate at a low or high level. Thus, the downstream end of the three channels 14 ends at an upper level for the transfer to respective first conveyors, such as conveyor belts 16 (only one shown for clarity) which lead to a packing machine. The downstream end of the three channels 15 terminates at a lower level which constitutes a transfer location to respective second conveyors, such as conveyor belts 17 which lead to a storing device or a standby packing apparatus.

Figure 2:
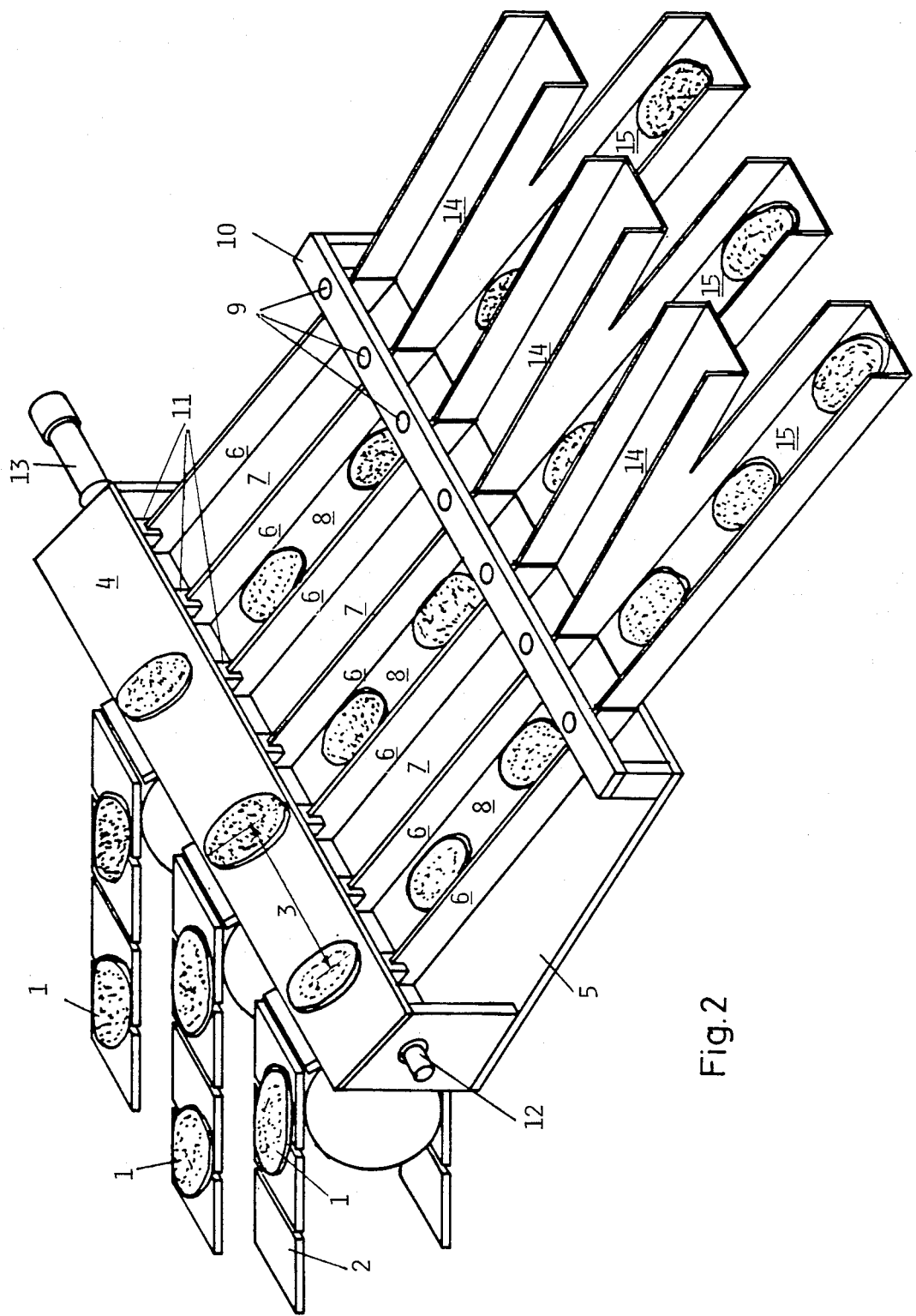

In the normal operation the re-routing apparatus according to the invention is set to its position illustrated in FIG. 1 in which the piston rod 12 of the cylinder unit 13 is in a fully extended state. In this position the items 1 are admitted from the plate chains 2 to the slide 4 and slide thereon into the channels 7 and into the upper channels 14 for transfer to the first conveyors 16 which advance the articles to a processing apparatus, such as a packing machine. If the latter becomes inoperative, for example, as a result of malfunction, the cylinder unit 13 is set into its other end position in which the piston rod 12 is in a retracted state as shown in FIG. 2. As a result, all the separating walls 6 are pivoted by virtue of the transverse motion of the forked actuators 11 into their position shown in FIG. 2 about the respective support pins 9, so that the items 1 drop from the slide 4 onto the channels 8 and therefrom arrive into the channels 15 from which they are transferred to the second conveyors 17 which advance the items 1, for example, to a standby processing machine.

The switching of the power device 13 between the two end positions may be effected while the plate chain 1 moves at full operational speed. There is no risk of jamming of the items 1 because they freely slide from above into the channel 7 or 8. The items 1 are, during the process of switching, handled in a very gentle manner, so that the apparatus is well adapted for relatively soft or very delicate articles. The apparatus needs only a few and simple movable parts. It is of simple and economical construction. In neither position of the apparatus will the items be exposed to a lateral side and therefore their orientation is not changed during handling by the re-routing apparatus. The slide 4, the base plate 5 and the channels 14, 15 may be of metal which provides for a cooling of the throughgoing biscuits 1.

It will be understood that the above description of the present invention is susceptible to various modifications, changes and adaptations, and the same are intended to be comprehended within the meaning and range of equivalents of the appended claims.

What is claimed is:

1. A re-routing apparatus for selectively channelling articles conveyed in at least two side-by-side arranged rows to one of a first and a second article advancing means, comprising
   (a) an inclined chute having a top input end arranged for simultaneously receiving articles belonging to different rows and a bottom discharge end towards which the articles slide on said chute;
   (b) a base plate extending from below said chute and being inclined downwardly in a conveying direction; said base plate having a receiving end situated underneath the discharge end of said chute for receiving the articles sliding off said discharge and; said base plate having a discharge end spaced from said receiving end in a direction parallel to said conveying direction;
   (c) a plurality of parallel, generally vertically oriented, mutually spaced separating walls arranged above said base plate and defining therewith a plurality of side-by-side arranged, alternating first and second channels; the number of said first channels and the number of said second channels at least equalling the number of said rows of articles; each channel having an upstream end corresponding to the receiving end of said base plate and a downstream end corresponding to the discharge end of said base plate; said first channels being arranged to supply articles to said first article advancing means and said second channels being arranged to supply articles to said second article advancing means; each said separating wall having a vertical height dimension in a zone of said chute; said vertical height dimension being at the most one half of a width dimension of each said channel measured perpendicularly to the conveying direction;
   (d) a separate pivot means for supporting an end of each separating wall for rotation about an axis perpendicular to said base plate and located at a downstream end of each wall for allowing a swinging motion of each separating wall about its said end thereof in a plane generally parallel to said base plate; and
   (e) actuating means connected to each separating wall for moving said separating walls in unison into a first position in which articles are received solely by said first channels from said chute and into a second position in which articles are received solely by said second channels from said chute; a distance between the first and second positions of any said separating wall at said upstream end of said channels substantially equalling said width dimension.

2. A re-routing apparatus as defined in claim 1, further wherein said first article advancing means has an input end situated at a first height level and said second article advancing means has an input end situated at a second height level which is different from said first height level; further comprising first additional channels each having an upstream end operatively aligned with a respective said downstream end of a separate said first channel; each said first additional channel having a downstream end situated at said first height level and being in operative alignment with said input end of said first article advancing means; and second additional channels each having an upstream end operatively aligned with a respective said downstream end of a separate said second channels; each said second additional channel having a downstream end situated at said second height level and being in operative alignment with said input end of said second article advancing means.

3. A re-routing apparatus as defined in claim 1, wherein said chute and said base plate have an angle of downward inclination in a conveying direction between 15° and 45°.

* * * * *